(12) United States Patent
Jull

(10) Patent No.: US 10,754,410 B2
(45) Date of Patent: Aug. 25, 2020

(54) SYSTEM AND METHOD FOR STANDBY MODE OPERATION OF POWER MANAGEMENT SYSTEM

(71) Applicant: Monolithic Power Systems, Inc., San Jose, CA (US)

(72) Inventor: Jeffrey Jull, Hillsboro, OR (US)

(73) Assignee: Monolithic Power Systems, Inc., San Jose, CA (US)

( * ) Notice: Subject to any disclaimer, the term of this patent is extended or adjusted under 35 U.S.C. 154(b) by 113 days.

(21) Appl. No.: 16/186,054

(22) Filed: Nov. 9, 2018

(65) Prior Publication Data

US 2020/0150738 A1 May 14, 2020

(51) Int. Cl.
*G06F 1/32* (2019.01)
*G06F 1/3206* (2019.01)
*G06F 1/3228* (2019.01)
*G06F 1/3246* (2019.01)

(52) U.S. Cl.
CPC ......... *G06F 1/3206* (2013.01); *G06F 1/3228* (2013.01); *G06F 1/3246* (2013.01)

(58) Field of Classification Search
CPC ..... G06F 1/3206; G06F 1/3228; G06F 1/3246
See application file for complete search history.

(56) References Cited

U.S. PATENT DOCUMENTS

| 2005/0149768 | A1* | 7/2005 | Kwa ..................... G06F 1/3215 713/300 |
| 2014/0181546 | A1* | 6/2014 | Hallberg ................. H02H 9/02 713/320 |
| 2017/0357304 | A1* | 12/2017 | Cheng ................... G06F 1/3296 |
| 2018/0004549 | A1* | 1/2018 | Han .................... G06F 9/44505 |

* cited by examiner

*Primary Examiner* — Stefan Stoynov
(74) *Attorney, Agent, or Firm* — Perkins Coie LLP

(57) ABSTRACT

A power management system having: a core rail, configured to provide a core voltage to a core; a GT rail, configured to provide a GT voltage to a graphic terminal; and a VR thermal indicative pin, coupled to a core thermal indicative pin of the core; wherein the VR thermal indicative pin is pulled down for a preset time duration once the core rail is commanded to exit a PS4 state, or for a time duration beginning when the core rail is commanded to exit the PS4 state ending when the GT rail is commanded to exit the PS4 state.

15 Claims, 4 Drawing Sheets

SYSTEM AND METHOD FOR STANDBY MODE OPERATION OF POWER MANAGEMENT SYSTEM

TECHNICAL FIELD

The present disclosure relates generally to information handling system and, more particularly, to system and method for standby mode operation of power management system providing regulated voltages, also called rails, to the information handling system.

BACKGROUND

A power management system applied to an information handling system, e.g. CPU, will adjust performance states according to the states of the information handling system so as to improve efficiency. For example, a core of the CPU may operate at various performance states or levels, so-called P-states, namely from P0 to PN. In general, the P0 performance state may correspond to the highest performance state than can be requested by an OS (Operating System), and PN performance state may correspond to the lowest performance state. In addition, sleep state of the core also has several levels, so-called C-states, namely from C0 to C10, while C10 refers to the deepest, lowest power sleep state. Accordingly, the power management system may specify different power consumption states, generally referred to as PS-states, PS0, PS1 to PSN states. When the core is active, the power management system runs at a PS0 state, and when the core sleeps, it may be placed in a low power state PS4.

Modern standby mode is used by a computer to mimic cell phone behavior where the device appears to be "off", but actually is still "connected". Correspondingly, the core enters the C10 state and the power management system is placed in PS4 state when the CPU is in deep sleep state, i.e., modern standby mode. Intel CPU with the core and power management system integrated, which is widely applied in computers, exits the modern standby mode (PS4/C10 state), and enter its high power turbo state (PS0/C0 state) to complete tasks as quickly as possible. This 'turbo' state consumes unnecessary power as the tasks are not complex during exiting the modern standby mode.

SUMMARY

It is an object of the present invention to provide a way to save the power consumption during when the CPU is exiting the PS4/C10 state.

In accomplishing the above objective, there has been provided, in accordance with an embodiment of the present invention, a power management system, comprising: a core rail, configured to provide a core voltage to a core; a GT rail, configured to provide a GT voltage to a graphic terminal; and a VR thermal indicative pin, coupled to a core thermal indicative pin of the core; wherein the VR thermal indicative pin is pulled down for a preset time duration once the core rail is commanded to exit a PS4 state, or for a time duration beginning when the core rail is commanded to exit the PS4 state and ending when the GT rail is commanded to exit the PS4 state.

In accomplishing the above objective, there has been provided, in accordance with an embodiment of the present invention, a processor comprising: a core; a graphic terminal; and a power management system, having a core rail configured to provide a core voltage to the core, and having a GT rail configured to provide a GT voltage to the graphic terminal; wherein the power management system has a VR thermal indicative pin coupled to a core thermal indicative pin of the core, and the VR thermal indicative pin is pulled down for a preset time duration once the core rail is commanded to exit a PS4 state, or for a time duration beginning when the core rail is commanded to exit the PS4 state and ending when the GT rail is commanded to exit the PS4 state.

Furthermore, there has been provided, in accordance with an embodiment of the present invention, a method of a power management system, wherein the power management system comprises a core rail, a GT rail and a VR thermal indicative pin, the method comprising: pulling down the VR thermal indicative pin for a preset time duration once the core rail is commanded to exit a PS4 state or for a time duration beginning when the core rail is commanded to exit the PS4 state and ending when the GT rail is commanded to exit the PS4 state.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments. These drawings are not necessarily drawn to scale. The relative sizes of elements illustrated by the drawings may differ from the relative size depicted.

The use of the same reference label in different drawings indicates the same or like components.

DETAILED DESCRIPTION

The following description provides exemplary embodiments of the technology. One skilled in the art will understand that the technology may be practiced without some or all of the features described herein. In some instances, well known structures and functions have not been shown or described in detail to avoid unnecessarily obscuring the description of the embodiments of the technology. In some instances, similar structures and functions that have been described in detail for other embodiments are not been described in detail for such embodiments to simplify and make clear understanding of the embodiments. It is intended that the terminology used in the description presented below be interpreted in its broadest reasonable manner, even though it is being used in conjunction with a detailed description of certain embodiments of the technology.

Figure 1:
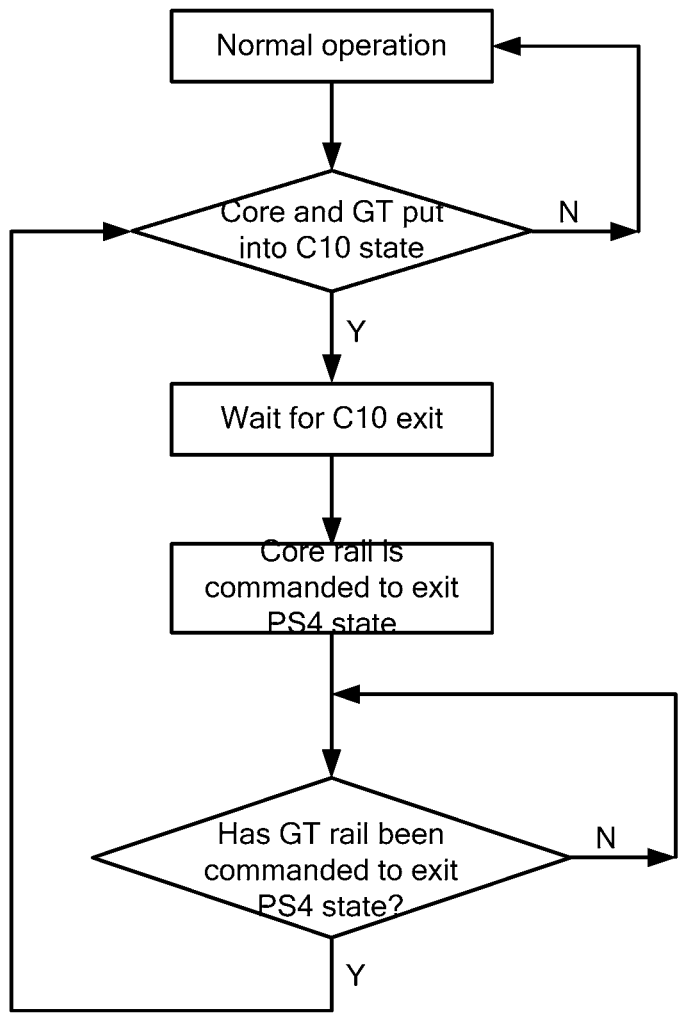
FIG. 1 shows a flow chart of a prior art interaction between a core rail, a graphic rail and a power management system.

FIG. 1 shows a flow chart of a prior art interaction between a core, a graphic terminal, and a CPU power management system, also referred as power management system. As shown in FIG. 1, a processor comprising a core rail, a graphic rail and the power management system may work in normal mode or in standby mode (PS4/C10 state). The power management system may comprise a core rail and a GT (graphic terminal) rail to respectively supply proper voltages to the processor core and the graphic terminal. When the processor works in normal mode, once the core rail and the GT rail receive commands to enter the PS4 state, the core rail and GT rail will maintain PS4 state until receiving the commands to exit the PS4 state. When going back to normal operation, usually, the core rail is commanded to exit PS4 state first, and then the GT rail will be commanded to exit PS4 state.

When the core rail is commanded to exit the PS4 state, the core may enter high power "turbo" state to complete tasks as quickly as possible. However, the core doesn't need to enter high power turbo state to accomplish these tasks.

Figure 2:
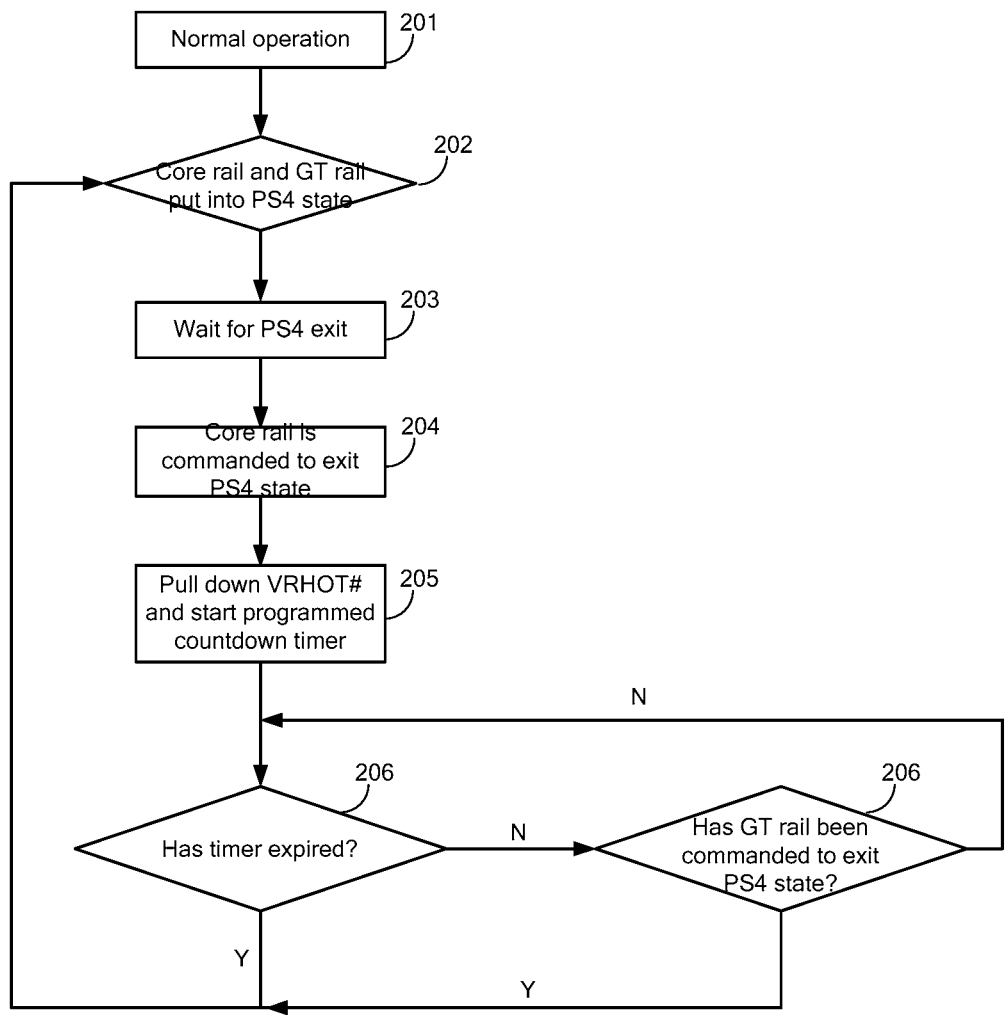
FIG. 2 shows a flow chart of interaction between a core rail, a graphic rail, and a power management system in accordance with an embodiment of the present invention.

FIG. 2 shows a flow chart of interaction between a core rail, a GT rail, and a power management system in accordance with an embodiment of the present invention. As shown in FIG. 2, the interaction between the core rail, the GT rail and the power management system may work in normal operation or in standby mode (PS4/C10 state). The interaction between the core rail, the GT rail and the power management system comprises: step 201, the core rail, the GT rail and the power management system work in normal mode; step 202, the core rail receives a command to enter the PS4 state; step 203, the core rail, the GT rail and the power management system work in PS4 state; step 204, the core rail receives a command to exit the PS4 state; step 205, a VR thermal indicative pin of the power management system is pulled low for a preset time duration Tw once the core rail is commanded to exit the PS4 state; step 206, the VR thermal indicative pin is released when the preset time duration Tw is ended or when the GT rail is commanded to exit the C10 state whichever is earlier.

The VR thermal indicative pin is connected to a core thermal pin of the core. In some applications, when the VR thermal indicative pin is pulled down, which means the power management system is over-temperature, and the thermal protection of the power management system is activated. In response, the core will enter a low-frequency working mode to save power and to decrease the load of the power management. That is to say, the power consumption of the core will be low when VR thermal indicative pin is pulled down.

The present invention pulls down the VR thermal indicative pin after the core rail is commanded to exit the PS4 state, so as to save the power consumption of the processor. After the time duration Tw or when the GT rail is commanded to exit the C10 state, whichever is earlier, the VR thermal indicative pin is released and the thermal indicative function is recovered.

Figure 3:
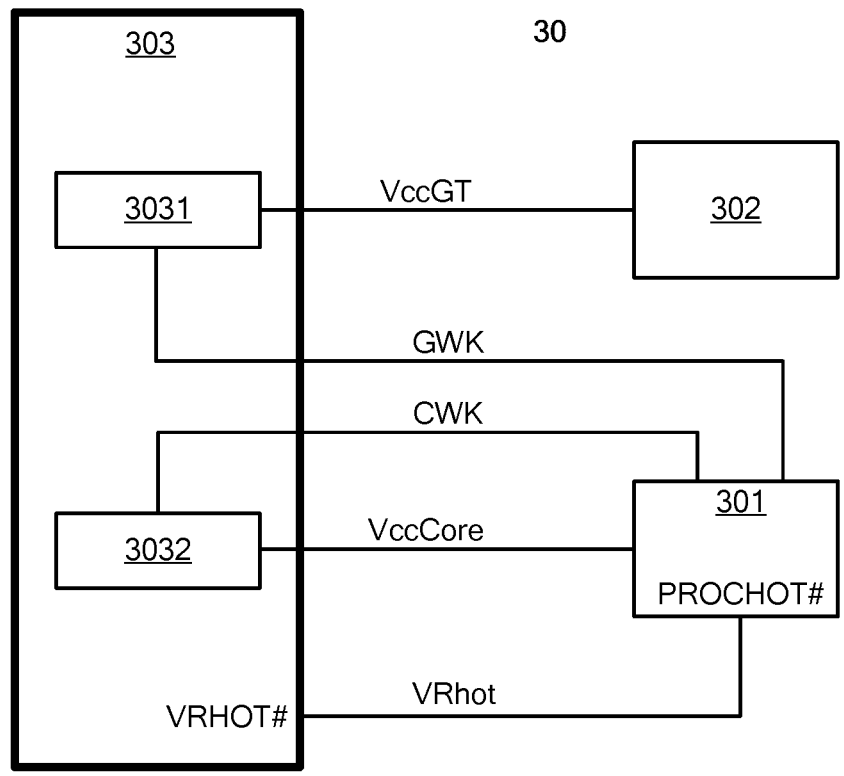
FIG. 3 schematically shows a processor 30 in accordance with an embodiment of the present invention.

FIG. 3 schematically shows a processor 30 in accordance with an embodiment of the present invention. The processor 30 comprises: a core 301 having a thermal indicative pin PROCHOT#, a graphic terminal 302; and a power management system 303 comprising a core rail 3032 to provide a core voltage VccCore to the core 301, and a GT rail 3031 to provide a GT voltage VccGT to the graphic terminal 302, wherein the power system 303 has a VR thermal indicative pin VRHOT# coupled to the core thermal indicative pin PROCHOT#, wherein the VR thermal indicative pin VRHOT# is pulled down for the preset time duration Tw once the core rail 3032 is commanded to exit a PS4 state or for a time duration beginning when the core rail 3032 is commanded to exit the PS4 state ending when the GT rail is commanded to exit the PS4 state.

As shown in FIG. 3, the core 301 sends a GT wakeup signal GWK to the GT rail 3031 to command the GT rail 3031 to exit the PS4 state, and sends a core wakeup signal CWK to the core rail 3032 to command the core rail 3032 to exit the PS4 state. Persons of ordinary skill in the art should know that the communication between the core 301, the graphic terminal 302 and the power management system 303 are frequent and multiple. For brevity, FIG. 3 only shows the interaction involved in the present invention.

Figure 4:
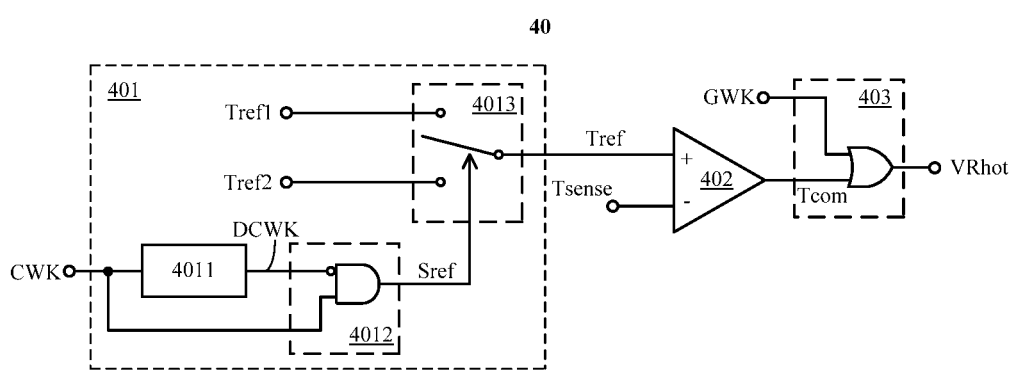
FIG. 4 schematically shows a thermal control circuit 40 in accordance with the embodiment of the present invention.

FIG. 4 schematically shows a thermal control circuit 40 in accordance with the embodiment of the present invention. The thermal control circuit 40 comprises: a thermal reference generator 401, configured to receive the core wakeup signal CWK, and to provide a thermal reference signal Tref (Is Tref a signal? A voltage? A current?); a comparator 402, configured to receive the thermal reference signal Tref and a thermal sense signal Tsense indicative of a temperature of the power management system, and to provide a comparison signal Tcom based on a comparison result of the thermal reference signal Tref and the thermal sense signal Tsense; and a logic circuit 403, configured to receive the comparison signal Tcom and the GT wakeup signal GWK, and to provide the thermal indicative signal VRhot based on a logic operation of the comparison signal Tcom and the GT wakeup signal GWK.

In the example of FIG. 4, the thermal reference generator 401 generates the thermal reference signal Tref based on the core wakeup signal CWK. When the core wakeup signal CWK commands the core rail 3032 to exit from the PS4 state, the thermal reference signal Tref equals to a first thermal reference signal Tref1 for a preset time duration Tw, otherwise, the thermal reference signal Tref equals to a second thermal reference Tref2. In FIG. 4, the thermal reference generator 401 comprises: a delay circuit 4011 configured to receive the core wakeup signal CWK, and to provide a delayed core wakeup signal DCWK, wherein a delay time between the core wakeup signal CWK and the delayed core wakeup signal DCWK is the preset time duration Tw; a small logic circuit 4012, configured to receive the core wakeup signal CWK and the delayed core wakeup signal DCWK, and to provide a selecting control signal Sref based on a logic operation of the core wakeup signal CWK and the delayed core wakeup signal DCWK, a selecting circuit 4013 configured to receive the first thermal reference signal Tref1, the second thermal reference signal Tref2 and the selecting control signal Sref, and to provide the first thermal reference signal Tref1 or the second thermal reference signal Tref2 based on the selecting control signal Sref.

Figure 5:
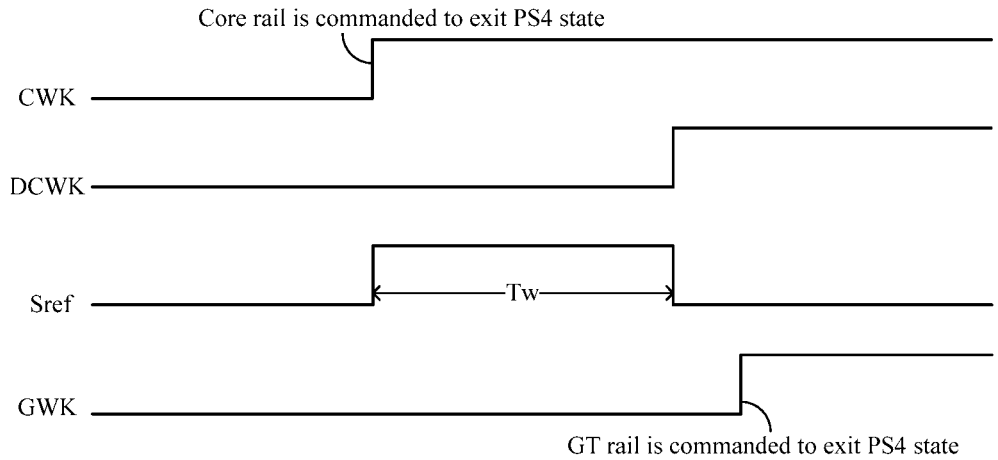
FIG. 5 shows waveforms of signals CWK, DCWK, Sref, GWK in accordance with an embodiment of the present invention.

FIG. 5 shows waveforms of signals CWK, DCWK, Sref, GWK in accordance with an embodiment of the present invention. As shown in FIG. 5, the core wakeup signal CWK flips from a low voltage level to a high voltage level when the core rail 3032 is commanded to exit the C10 state, and the small logic circuit 4015 comprises an AND gate. The delayed core wakeup signal DCWK is inverted before provided to the AND gate. After AND operation, the selecting control signal Sref flips to a high voltage level and maintains for a time duration Tw once the core rail 3032 is commanded to exit the PS4 state. And during when the selecting control signal Sref has a high voltage level, the first thermal reference signal Tref1 is selected to be the thermal reference signal Tref.

In one embodiment, the first thermal reference signal Tref1 is smaller than the second thermal reference signal Tref2. In one embodiment, the first thermal reference signal Tref1 is preset to be smaller than the normal value of the thermal sense signal Tsense, and the second thermal reference signal Tref2 is preset to be larger than the normal value of the thermal sense signal Tsense. Here, by normal value, it means the thermal sense signal Tsense has the value when there is no over temperature is happening in the power management system. So when the core rail 3032 is commanded to exit the PS4 state, the first thermal reference signal Tref1 is selected to be the thermal reference signal Tref, and is lower than the thermal sense signal Tsense. The thermal reference signal Tref is provided to an inverting input terminal of the comparator 402, and the thermal sense signal Tsense is provided to a non-inverting input terminal of the comparator 402. As a result, the comparison signal Tcom is pulled down, and maintains for the time duration Tw.

In the example of FIG. 4, the logic circuit 403 comprises an OR gate. The OR gate receives the GT wakeup signal GWK and the comparison signal Tcom, and provides the thermal indicative signal VRhot. In FIG. 5, the GT wakeup signal GWK flips from a low voltage level to a high voltage level when the GT rail 3031 is commanded to exit the PS4 state.

When the core rail 3032 is commanded to exit the PS4 state, the first thermal reference signal Tref1 is selected to be the thermal reference signal Tref which is lower than the thermal sense signal Tsense. As a result, the comparison signal Tcom flips to a low voltage level, and the thermal indicative signal VRhot is pulled down. The thermal indicative signal VRhot is released when the time duration Tw expires and the second thermal reference signal Tref2 is selected to be the thermal reference signal Tref. However, even in the time duration Tw, the thermal indicative signal VRhot will be released if the GT wakeup signal GWK flips to the high voltage level, i.e., the GT rail 3031 is commanded to exit the PS4 state. That is to say, the thermal indicative signal VRhot will be released, e.g., pulled up, when the GT rail 3031 is commanded to exit the PS4 state or the time duration Tw beginning when the core rail 3032 is commanded to exit the PS4 state is over.

Persons of ordinary skill in the art should know that when the logic relationship between the signals CWK, GWK and VRhot are changed, the small logic circuit 4015 and the logic circuit 403 will be different accordingly. For example, if the core wakeup signal CWK flips from high to low when the core 301 is commanded to exit the C10 state, the small logic circuit 4015 may comprise a XOR gate.

Any circuit performs the function illustrated in the above paragraphs could be used as the thermal control circuit. By describing the above described functions in the hardware description language, e.g., VHDL (Very High-speed-integrated-circuits Description Language) or Verilog, the thermal control circuit 40 could be realized in digital way.

Figure 6:
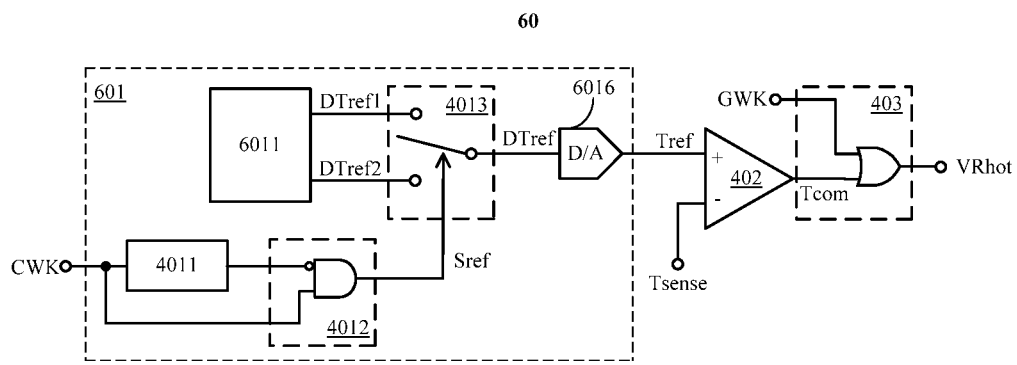
FIG. 6 schematically shows a thermal control circuit 60 in accordance with the embodiment of the present invention.

FIG. 6 schematically shows a thermal control circuit 60 in accordance with the embodiment of the present invention. Compared to the thermal control circuit 40 in FIG. 4, the first thermal reference signal DTref1 and the second thermal reference signal DTref2 are digital signals respectively read from a register circuit 6011. The thermal reference generator 601 further comprises a digital-to-analog converter 6016 configured to convert the digital thermal reference signal DTref to the thermal reference signal Tref which is an analog signal.

Figure 7:
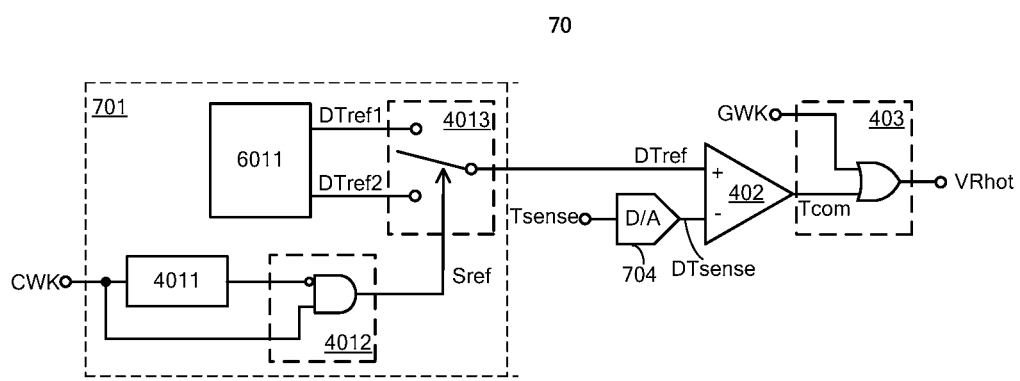
FIG. 7 schematically shows a thermal control circuit 70 in accordance with the embodiment of the present invention.

FIG. 7 schematically shows a thermal control circuit 70 in accordance with the embodiment of the present invention. Compared to the thermal control circuit 40 in FIG. 4, the first thermal reference signal DTref1 and the second thermal reference signal DTref2 are digital signals respectively read from a register circuit 6011. The thermal control circuit 70 further comprises an analog-to-digital converter 704 configured to convert the thermal sense signal Tsense to a digital thermal sense signal DTsense. Furthermore, the comparator 402 comprises a digital comparator.

While the above Detailed Description describes certain embodiments, the present invention is not limited to the features described and may be practice in many ways. Details of the system may vary in implementation, while still being encompassed by the present invention disclosed herein. Accordingly, the scope of the present invention encompasses not only the disclosed embodiments, but also all equivalent ways of practicing or implementing the present invention under the claims.

I claim:

1. A power management system, comprising:
a core rail, configured to provide a core voltage to a core;
a GT rail, configured to provide a GT voltage to a graphic terminal; and
a VR thermal indicative pin, coupled to a core thermal indicative pin of the core;
wherein the VR thermal indicative pin is pulled down for a preset time duration once the core rail is commanded to exit a PS4 state, or for a time duration beginning when the core rail is commanded to exit the PS4 state and ending when the GT rail is commanded to exit the PS4 state.

2. The power management system of claim 1, wherein the core rail receives a core wakeup signal from the core, and exits the PS4 state based on the core wakeup signal.

3. The power management system of claim 1, wherein the GT rail receives a GT wakeup signal from the core, and exits the PS4 state based on the GT wakeup signal.

4. The power management system of claim 1 further comprising a thermal control circuit, wherein the thermal control circuit comprises:
a thermal reference generator, configured to receive a core wakeup signal, and to provide a thermal reference signal;
a comparator, configured to receive the thermal reference signal and a thermal sense signal indicative of a temperature of the power management system, and to provide a comparison signal based on a comparison result of the thermal reference signal and the thermal sense signal; and
a logic circuit, configured to receive the comparison signal and a GT wakeup signal, and to provide a thermal indicative signal at the VR thermal indicative pin based on a logic operation of the comparison signal and the GT wakeup signal.

5. The power management system of claim 4, wherein the thermal reference generator comprises:
a delay circuit, configured to receive the core wakeup signal, and to provide a delayed core wakeup signal, wherein a delay time between the core wakeup signal and the delayed core wakeup signal is the preset time duration;
a small logic circuit, configured to receive the core wakeup signal and the delayed core wakeup signal, and to provide a selecting control signal based on a logic operation of the core wakeup signal and the delayed core wakeup signal; and a selecting circuit, configured to receive a first thermal reference signal, a second thermal reference signal and the selecting control signal, and to provide the first thermal reference signal or the second thermal reference signal as a thermal reference signal based on the selecting control signal.

6. The power management system of claim 4, wherein the thermal reference generator comprises:
a delay circuit, configured to receive the core wakeup signal, and to provide a delayed core wakeup signal, wherein a delay time between the core wakeup signal and the delayed core wakeup signal is the preset time duration;
a small logic circuit, configured to receive the core wakeup signal and the delayed core wakeup signal, and to provide a selecting control signal based on a logic operation of the core wakeup signal and the delayed core wakeup signal;
a selecting circuit, configured to receive a first digital thermal reference signal, a second digital thermal reference signal and the selecting control signal, and to provide the first digital thermal reference signal or the second digital thermal reference signal as a digital thermal reference signal based on the selecting control signal; and
a digital-to-analog converter, configured to receive the digital thermal reference signal, and to convert the digital thermal reference signal to the thermal reference signal.

7. The power management system of claim 6, wherein the first digital thermal reference signal and the second digital thermal reference signal are provided by a register circuit.

8. The power management system of claim 4, wherein the thermal reference generator comprises:
a delay circuit, configured to receive the core wakeup signal, and to provide a delayed core wakeup signal, wherein a delay time between the core wakeup signal and the delayed core wakeup signal is the preset time duration;
a small logic circuit, configured to receive the core wakeup signal and the delayed core wakeup signal, and to provide a selecting control signal based on a logic operation of the core wakeup signal and the delayed core wakeup signal; and
a selecting circuit, configured to receive a first digital thermal reference signal, a second digital thermal reference signal and the selecting control signal, and to provide the first digital thermal reference signal or the second digital thermal reference signal as a digital thermal reference signal based on the selecting control signal.

9. The power management system of claim 8, wherein the thermal control circuit further comprises:
an analog-to-digital converter configured to convert the thermal sense signal to a digital thermal sense signal;
wherein the comparator comprises a digital comparator receiving the digital thermal reference signal and the digital thermal sense signal, and providing the comparison signal based on the digital thermal reference signal and the digital thermal sense signal.

10. A processor comprising:
a core;
a graphic terminal; and
a power management system, having a core rail configured to provide a core voltage to the core, and having a GT rail configured to provide a GT voltage to the graphic terminal;
wherein the power management system has a VR thermal indicative pin coupled to a core thermal indicative pin of the core, and the VR thermal indicative pin is pulled down for a preset time duration once the core rail is commanded to exit a PS4 state, or for a time duration beginning when the core rail is commanded to exit the PS4 state and ending when the GT rail is commanded to exit the PS4 state.

11. The processor of claim 10, wherein the power management system further comprises a thermal control circuit, and wherein the thermal control circuit comprises:
a thermal reference generator, configured to receive a core wakeup signal, and to provide a thermal reference signal;
a comparator, configured to receive the thermal reference signal and a thermal sense signal indicative of a temperature of the power management system, and to provide a comparison signal based on a comparison result of the thermal reference signal and the thermal sense signal; and
a logic circuit, configured to receive the comparison signal and a GT wakeup signal, and to provide the thermal indicative signal based on a logic operation of the comparison signal and the GT wakeup signal;
wherein the core rail exits a PS4 state based on the core wakeup signal and the GT rail exits the PS4 state based on the GT wakeup signal.

12. The processor of claim 11, wherein the thermal reference generator comprises:
a delay circuit, configured to receive the core wakeup signal, and to provide a delayed core wakeup signal, wherein a delay time between the core wakeup signal and the delayed core wakeup signal is the preset time duration;
a small logic circuit, configured to receive the core wakeup signal and the delayed core wakeup signal, and to provide a selecting control signal based on a logic operation of the core wakeup signal and the delayed core wakeup signal; and
a selecting circuit, configured to receive a first thermal reference signal, a second thermal reference signal and the selecting control signal, and to provide the first thermal reference signal or the second thermal reference signal based on the selecting control signal.

13. A method of a power management system, wherein the power management system comprises a core rail, a GT rail and a VR thermal indicative pin, the method comprising:
pulling down the VR thermal indicative pin for a preset time duration once the core rail is commanded to exit a PS4 state or for a time duration beginning when the core rail is commanded to exit the PS4 state and ending when the GT rail is commanded to exit the PS4 state.

14. The method of a power management system of claim 13, wherein the core rail is commanded to exit the PS4 state based on a core wakeup signal from a core powered by the power management system.

15. The method of a power management system of claim 13, wherein the GT rail is commanded to exit the PS4 state based on a GT wakeup signal from a core powered by the power management system.

* * * * *